United States Patent
Tanaka et al.

(10) Patent No.: US 10,651,939 B2
(45) Date of Patent: May 12, 2020

(54) OPTICAL TRANSCEIVER AND METHOD OF CONTROLLING THE SAME

(71) Applicant: SUMITOMO ELECTRIC INDUSTRIES, LTD., Osaka (JP)

(72) Inventors: Hiromi Tanaka, Osaka (JP); Ryutaro Futami, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/260,583

(22) Filed: Jan. 29, 2019

(65) Prior Publication Data

US 2019/0238232 A1    Aug. 1, 2019

(30) Foreign Application Priority Data

Jan. 31, 2018  (JP) ................................. 2018-015162

(51) Int. Cl.
*H04B 10/40* (2013.01)
*G06F 13/38* (2006.01)
*H04L 12/02* (2006.01)
*H04L 12/413* (2006.01)

(52) U.S. Cl.
CPC ........... *H04B 10/40* (2013.01); *G06F 13/385* (2013.01); *H04L 12/02* (2013.01); *H04L 12/413* (2013.01)

(58) Field of Classification Search
None
See application file for complete search history.

(56) References Cited

U.S. PATENT DOCUMENTS

| | | | | |
|---|---|---|---|---|
| 2012/0207478 A1* | 8/2012 | Tanaka | ................... | H04B 10/40 398/79 |
| 2012/0213526 A1* | 8/2012 | Tanaka | ................... | H04B 10/40 398/135 |
| 2014/0244910 A1* | 8/2014 | Tanaka | ................... | H04B 10/40 711/103 |
| 2015/0030336 A1* | 1/2015 | Tanaka | ................... | H04B 10/40 398/135 |
| 2016/0087676 A1* | 3/2016 | Tanaka | ..................... | H04B 3/32 398/193 |

FOREIGN PATENT DOCUMENTS

| | | |
|---|---|---|
| JP | 2004-297682 | 10/2004 |
| JP | 2008-512904 | 4/2008 |
| WO | 2006/029263 | 3/2006 |

* cited by examiner

*Primary Examiner* — David W Lambert
(74) *Attorney, Agent, or Firm* — Smith, Gambrell & Russell, LLP.

(57) ABSTRACT

An optical transceiver includes an optical transmitter, an optical receiver, a first processing unit for controlling a section of the optical transmission circuit, a second processing unit for controlling a section of the optical reception circuit, and a signal line. First and second memory regions constitute a MDIO register space. The selection signal is set to a first level when the first memory region includes a MDIO register, and alternatively is set to a second level when the second memory region includes the MDIO register. The first processing unit responds to another MDIO frame having an OP code set to other than "00h" when the selection signal is at the first level, and the second processing unit alternatively responds to the another MDIO frame when the selection signal is at the second level.

10 Claims, 11 Drawing Sheets

| OP | ACCESS TYPE | ADDRESS/DATA |
|---|---|---|
| 00b | ADDRESS | ADDRESS |
| 01b | WRITE | WRITE DATA |
| 11b | READ | READ DATA |
| 10b | READ INCREMENT ADDRESS | READ DATA |

Fig.4

| REGISTER ADDRESS | INFORMATION |
|---|---|
| A2A0h | LANE0 Tx BIAS MONITOR |
| A2A1h | LANE1 Tx BIAS MONITOR |
| A2A2h | LANE2 Tx BIAS MONITOR |
| A2A3h | LANE3 Tx BIAS MONITOR |
| . . . . | . . . . |
| A2B0h | LANE0 Tx POWER MONITOR |
| A2B1h | LANE1 Tx POWER MONITOR |
| A2B2h | LANE2 Tx POWER MONITOR |
| A2B3h | LANE3 Tx POWER MONITOR |
| . . . . | . . . . |
| A2C0h | LANE0 LD TEMPERATURE MONITOR |
| A2C1h | LANE1 LD TEMPERATURE MONITOR |
| A2C2h | LANE2 LD TEMPERATURE MONITOR |
| A2C3h | LANE3 LD TEMPERATURE MONITOR |
| . . . . | . . . . |
| A2D0h | LANE0 Rx POWER MONITOR |
| A2D1h | LANE1 Rx POWER MONITOR |
| A2D2h | LANE2 Rx POWER MONITOR |
| A2D3h | LANE3 Rx POWER MONITOR |
| . . . . | . . . . |

Rows A2A0h through A2C3h (and continuation dots) are grouped as 56.
Rows A2D0h through A2D3h (and continuation dots) are grouped as 58.

OPTICAL TRANSCEIVER AND METHOD OF CONTROLLING THE SAME

TECHNICAL FIELD

An aspect of the present invention relates to an optical transceiver and a method of controlling the same.

BACKGROUND

In optical transceivers, an electrical signal is converted into an optical signal for transmission and an optical signal is converted into an electrical signal for reception. Japanese Unexamined Patent Publication No. 2004-297682 discloses that an optical transceiver has a plurality of processing units. Japanese Unexamined Patent Publication No. 2008-512904 discloses an optical transceiver provided with firmware. When an optical transceiver includes a plurality of processing units, for example, one processing unit of the plurality of processing units performs serial communication with an external apparatus which conducts monitoring and controlling the optical transceiver. When one processing unit communicates with the external apparatus regarding information to be processed by another processing unit of the plurality of processing units, the one processing unit needs internal communication to access another processing unit, so that a delay may be caused in communication with the external apparatus due to the time taken for the internal communication. There is concern that such a delay will hinder the optical transceiver from responding to the external apparatus within a predetermined time.

SUMMARY

According to an aspect of the invention in this application, an optical transceiver configured to receive an MDIO frame from an external apparatus through an MDIO communication bus, the MDIO frame having an OP code set to "00h" and an MDIO register address set in a payload thereof, the optical transceiver includes an optical transmission circuit configured to convert a first electrical signal into a first optical signal, an optical reception circuit configured to convert a second optical signal into a second electrical signal, a first processing unit configured to control a first section of the optical transmission circuit and the optical reception circuit and communicate with the external apparatus through the MDIO communication bus, the first processing unit including a first memory having a first memory region, the first memory region including a first plurality of MDIO registers that store data for controlling the first section, a second processing unit configured to control a second section of the optical transmission circuit and the optical reception circuit and communicate with the external apparatus through the MDIO communication bus, the second processing unit including a second memory having a second memory region, the second memory region including a second plurality of MDIO registers that store data for controlling the second section, and a signal line for sending a selection signal from the first processing unit to the second processing unit. The first memory region and the second memory region constitute a MDIO register space. The selection signal is set to a first level when the first memory region includes a MDIO register designated by the MDIO register address, and alternatively set to a second level when the second memory region includes the MDIO register designated by the MDIO register address. The first processing unit responds to another MDIO frame having an OP code set to other than "00h" when the selection signal is at the first level, and the second processing unit alternatively responds to the another MDIO frame when the selection signal is at the second level.

BRIEF DESCRIPTION OF THE DRAWINGS

FIG. 4 is an example of information stored in an MDIO register in Example 1.

DETAILED DESCRIPTION

Specific examples of an optical module according to an embodiment of the present invention will be described below with reference to the drawings. In description of the drawings, the same reference signs are applied to the same or corresponding elements, and duplicate description thereof will be omitted. The present invention is not limited to these examples. It is intended that the present invention includes all the changes within the meaning and the range indicated by the claims and equivalent to the claims.

Example 1

As Example, a 100 Gbps optical transceiver conforming to the 100G form-factor pluggable (CFP) 4 multi-source agreement (MSA), which is an industrial standard, will be described. The optical transceiver includes a transmitter unit and a receiver unit. Each of the transmitter unit and the receiver unit has four lanes (channels). The transmission rate of each lane is approximately 25 Gbps, for example. For example, a lane handles an electrical signal for transmitting information and means a path of the electrical signal. One lane transmits information independently from other lanes. Accordingly, the electrical signal in one lane is handled independently from signals in other lanes. For example, one lane corresponds to one wavelength (channel) of a wavelength division multiplexing (WDM) system. In addition to the meaning described above, there are cases in which a lane also means an optical signal having a single wavelength (peak wavelength) after being converted from an electrical signal and before being multiplexed by an optical multiplexer, or an optical signal having a single wavelength (peak wavelength) after being separated by an optical demultiplexer and before being converted into an electrical signal, or one of paths of the optical signals. When conforming to a standard other than the CFP 4 MSA, the number of lanes may be other than four, and eight lanes, ten lanes, or 16 lanes may be adopted in accordance with the standard, for example.

(Description of Block Diagram)

Figure 1:
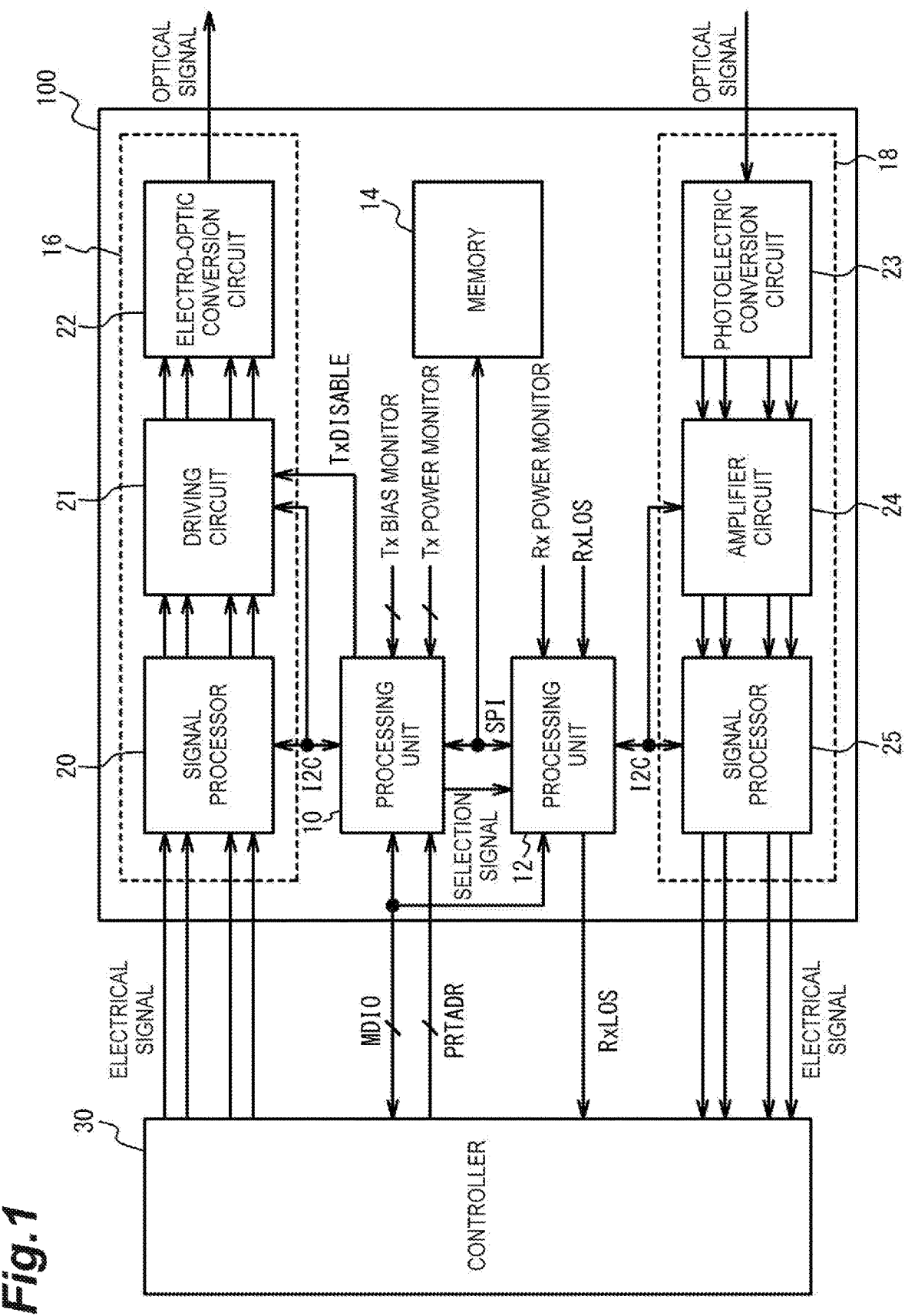
FIG. 1 is a block diagram illustrating a configuration of an optical transceiver according to Example 1.

FIG. 1 is a block diagram illustrating a configuration of an optical transceiver according to Example 1. As illustrated in FIG. 1, an optical transceiver 100 according to Example 1 includes processing units (processors) 10 and 12, a memory 14, an optical transmission circuit (transmitter unit) 16, and an optical reception circuit (receiver unit) 18. For example, the processing unit 10 is a processing unit such as a central processing unit (CPU) or a microcomputer and controls the optical transmission circuit (transmitter unit) 16. For example, the processing unit 12 is a processing unit such as a central processing unit (CPU) or a microcomputer and controls the optical reception circuit 18 (receiver unit).

For example, the processing units 10 and 12 may be logic devices which are programmable, such as programmable logic devices (PLD), complex programmable logic devices (CPLD), or field programmable gate arrays (FPGA). The programmable logic devices can modify or add a function thereof by rewriting circuit information which specifies an internal circuit configuration. Such circuit information for the logic devices can be also handled like firmware for the CPUs. The programmable logic devices include logic devices internally provided with a nonvolatile memory (for example, a flash read-only memory (ROM)) similar to a microcomputer and rewrite circuit information stored in the nonvolatile memory similar to rewriting firmware of a microcomputer.

The memory 14 is a nonvolatile memory such as an electrically erasable programmable read-only memory (EEPROM) and can store data and/or firmware without receiving electricity supply.

The optical transmission circuit 16 converts electrical signals (electrical transmission signals) of four lanes transmitted from a controller 30 (external apparatus) into four optical signals having wavelengths different from each other, performs wavelength multiplexing in which these four optical signals are multiplexed into one wavelength division multiplexing (WDM) signal, and outputs the WDM signal to an optical fiber (not illustrated). For example, the optical transmission circuit 16 includes a signal processor 20, a driving circuit 21, and an electro-optic conversion circuit 22. For example, the signal processor 20 is a clock data recovery (CDR) circuit and improves electrical signals of four lanes transmitted from the controller 30. Examples of improving electrical signals include waveform shaping and timing reproduction. For example, the driving circuit 21 is a laser diode driver (LDD) circuit. The driving circuit 21 amplifies a processed electrical signal, generates a driving signal, and drives the electro-optic conversion circuit 22 in accordance with the driving signal. For example, the electro-optic conversion circuit 22 is a transmitter optical subassembly (TOSA), which modulates an optical signal in accordance with a driving signal input from the driving circuit 21, multiplexes the modulated optical signal with other modulated optical signals, and outputs the multiplexed signal to an external optical waveguide (not illustrated) such as an optical fiber. An optical signal (optical transmission signal) output to an optical waveguide is a wavelength division multiplexing signal (WDM signal). For example, in the electro-optic conversion circuit 22, an optical signal is generated by directly driving a laser diode in accordance with a driving signal (direct modulation system), or an optical signal is generated by driving an optical modulator in accordance with a driving signal and modulating continuous light (CW light) supplied from a light source (external modulation system).

A photoelectric conversion circuit 23 converts an optical signal (wavelength division multiplexing signal) received from an optical fiber or the like into electrical signals of four lanes and outputs the converted signals to the controller 30. For example, the optical reception circuit 18 includes the photoelectric conversion circuit 23, an amplifier circuit 24, and a signal processor 25. For example, the photoelectric conversion circuit 23 is a receiver optical subassembly (ROSA), which converts an optical signal (wavelength division multiplexing signal) transmitted via an optical fiber into current signals (photoelectric currents) of four lanes. For example, the photoelectric conversion circuit 23 demultiplexes a wavelength division multiplexing signal into a plurality of optical signals each having a single wavelength (peak wavelength) and converts the demultiplexed optical signals into electrical signals (photoelectric currents) using photodiodes. For example, the amplifier circuit 24 is a transimpedance amplifier (TIA), which converts a current signal (photoelectric current) converted by the photoelectric conversion circuit 23 into a voltage signal. The signal processor 25 improves the converted voltage signals and outputs the improved signals to the controller 30.

The controller 30, the processing unit 10, and the processing unit 12 are electrically connected to each other via a serial communication bus such as a management data input/output (MDIO) communication bus. The processing units 10 and 12 are connected to the serial communication bus in parallel (bus connection). The MDIO communication bus includes a clock signal line MDC and a data signal line MDIO. The clock signal line MDC transmits a repetitive signal (clock signal) with a certain cycle for achieving synchronization. The data signal line MDIO transmits digital signals (data signals) of two values synchronized with the clock signal of the clock signal line MDC, and the data signal line MDIO transmits an MDIO frame, which will be described below. The optical transceiver 100 may be hot pluggable. A hot pluggable optical transceiver is electrically connected to the controller 30 when a main body thereof is plugged into the controller 30. The optical transceiver 100 includes an electrical plug (not illustrated) having a plurality of terminals. Electrical connection is secured when the plurality of terminals of the electrical plug are fitted into an electrical connector of the controller 30. The clock signal line MDC is assigned to one terminal and the data signal line MDIO is assigned to another terminal. The processing units 10 and 12 are connected to the MDIO communication bus in parallel inside the optical transceiver 100.

A PRTADR is a signal line for designating the address of the optical transceiver 100 for MDIO communication. The PRTADR has five signal lines. Up to 32 optical transceivers 100 can be connected to the MDIO communication bus. The PRTADR is used for designating an optical transceiver with which the controller 30 communicates when a plurality of optical transceivers are connected to the MDIO communication bus, because two or more optical transceivers connected to the MDIO communication bus are unable to simultaneously communicate with the controller 30. The processing unit 10 communicates with the signal processor 20 and the driving circuit 21 through serial communication of an inter-integrated circuit (I2C) or the like. For example, the processing unit 10 is electrically connected to the signal processor 20 and the driving circuit 21 via an I2C bus. The processing unit 10 deactivates a particular lane within the driving circuit 21 by using a TxDISABLE signal. Due to the deactivation, an optical signal which has a single wavelength and corresponds to the particular lane is disabled from being transmitted. Moreover, the processing unit 10 acquires a monitoring value and/or a signal related to the transmission state of the optical signal, such as a Tx bias monitoring value or a Tx power monitoring value, from the optical transmission circuit 16. For example, the Tx bias monitoring value is a detection value of the intensity of bias currents of the laser diodes of four lanes included in the electro-optic conversion circuit 22. The Tx power monitoring value is a detection value of the strength (optical power) of an optical signal (wavelength division multiplexing signal) output from the electro-optic conversion circuit 22. The Tx power monitoring value may be a detection value of the strength of each of the optical signals of four lanes included in the wavelength division multiplexing signal.

The processing unit 12 communicates with the signal processor 25 and the amplifier circuit 24 through serial communication of I2C or the like. For example, the processing unit 12 is electrically connected to the signal processor 25 and the amplifier circuit 24 via the I2C bus. The processing unit 12 acquires a monitoring value and/or a signal related to the reception state of the optical signal, such as an Rx power monitoring value or an RxLOS (lost of signal) signal, from the optical reception circuit 18. For example, the Rx power monitoring value is a detection value of the strength (optical power) of the optical signals of four lanes. The RxLOS signal is a signal indicating that the strength of the optical signals of four lanes of the optical reception circuit 18 is smaller than a predetermined value. The processing unit 12 outputs the RxLOS signal to the controller 30. The RxLOS signal is adopted to warn of disappearance of an optical signal received by the photoelectric conversion circuit 23 from an optical fiber (state in which the strength becomes smaller than a predetermined value). Since the RxLOS signal is a signal of high urgency, it is output to the controller 30 via dedicated signal wiring instead of transmission through the serial communication bus. For example, the RxLOS signal is a binary signal indicating "H" in a normal state and indicating "L" in an unusual state.

The processing unit 10 and the processing unit 12 communicate with the memory 14 through serial communication of a serial peripheral interface (SPI) or the like. For example, the processing unit 10 and the processing unit 12 are electrically connected to the memory 14 via the I2C bus. The processing units 10 and 12 are connected to each other through a selective line. The processing unit 10 transmits a selection signal (high level or low level) to the processing unit 12 by using the selective line. The selection signal will be described below in detail.

(Description of Processing Unit)

Figure 2:
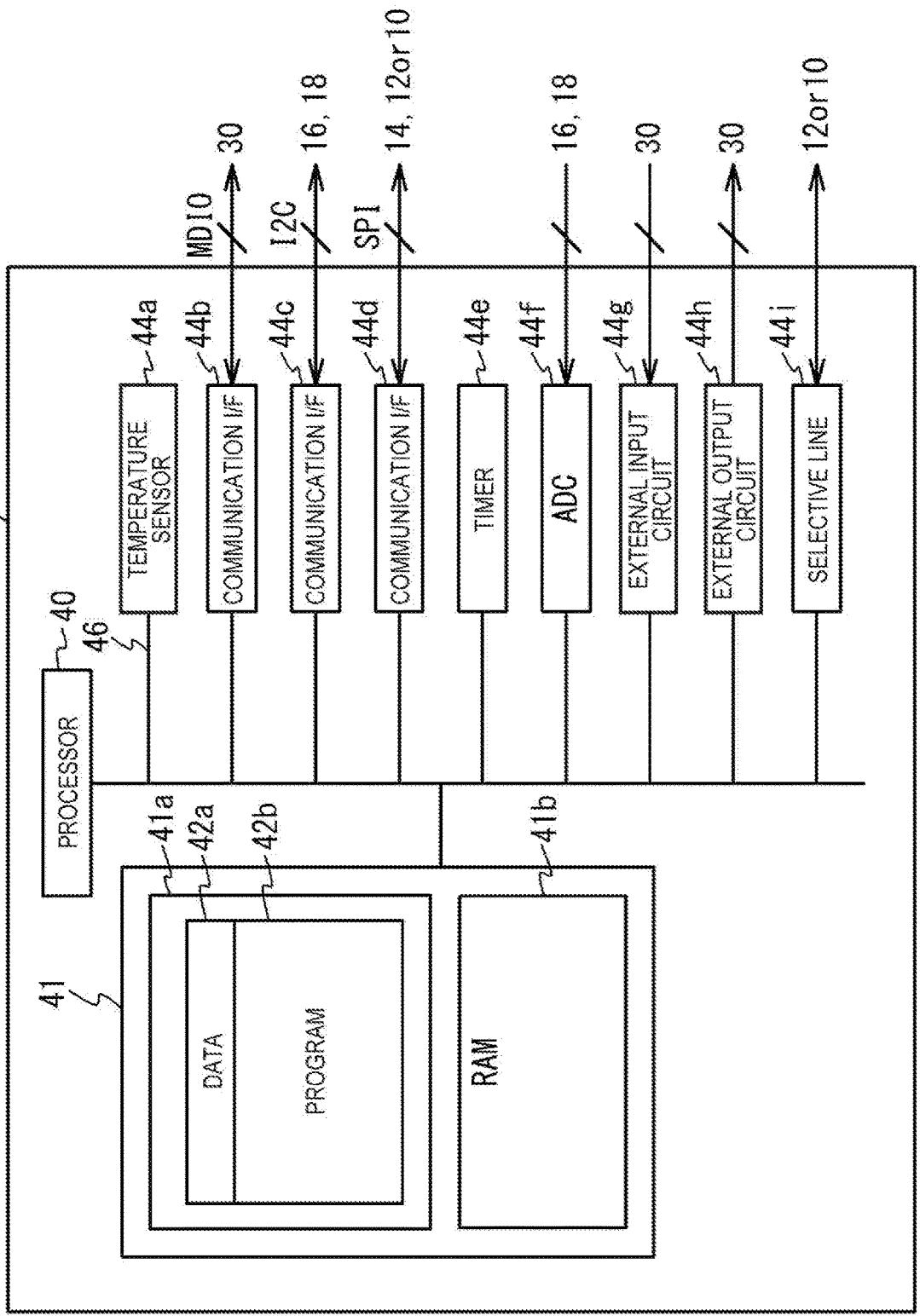
FIG. 2 is a block diagram illustrating an internal configuration of a processing unit in Example 1.

FIG. 2 is a block diagram illustrating an internal configuration of a processing unit in Example 1. As illustrated in FIG. 2, each of the processing units 10 and 12 includes a processor (calculation circuit) 40, a storage circuit (internal memory) 41, a temperature sensor 44a, communication interfaces (I/F) 44b to 44d, a timer 44e, an analog/digital conversion circuit (ADC) 44f, an external input circuit 44g, an external output circuit 44h, a selective line 44i, and an internal bus 46. FIG. 2 illustrates an example of basic configurations of the processing units 10 and 12, which may include a functional module other than the functional modules described above. The processing units 10 and 12 do not necessarily include all of the illustrated functional modules and may include only necessary functional modules. The processing unit 10 may have the same configuration as the processing unit 12 or may have a different configuration. For example, the processor 40 is a CPU core, which performs various kinds of processing by executing a program (firmware) stored in the storage circuit 41. The storage circuit 41 includes a read-only memory (ROM) 41a and a random access memory (RAM) 41b. The ROM 41a stores various kinds of data 42a and a program 42b such as firmware. For example, the ROM 41a is a flash memory.

The temperature sensor 44a detects the temperature within the processing unit and outputs temperature information to the processor 40 through the internal bus in accordance with an inquiry from the processor 40. For example, the communication I/F 44b is a MDIO interface, which is an interface for communicating with the controller 30. For example, the communication I/F 44c is an I2C interface, which is an interface for communicating with the optical transmission circuit 16 or the optical reception circuit 18. For example, the communication I/F 44d is A SPI interface, through which the processing unit 12 or 10 communicates with the memory 14. A memory address is allocated in the RAM 41b for data handled by each functional module. For example, each functional module performs processing in accordance with data stored at a certain memory address and stores a processed result at another memory address. The processor 40 controls each functional module by reading and writing data at these memory addresses.

For example, the timer 44e is a timer using a counter circuit. The timer 44e measures a predetermined time in accordance with the number of counts or generates interruption processing at a set time. The ADC 44f converts an analog value input from the optical transmission circuit 16 or the optical reception circuit 18 into a digital data. Examples of an analog value converted into a digital data include the Tx bias monitoring value, the Tx power monitoring value, and the Rx power monitoring value. The external input circuit 44g receives the PRTADR or the like from the controller 30. The external output circuit 44h outputs an alarm signal to the controller 30. The external input circuit 44g and the external output circuit 44h may be general-purpose interfaces provided in a general-purpose microcomputer. A selection signal is output to the processing unit 12 through the selective line 44i provided in the processing unit 10, and a selection signal is input from the processing unit 10 through the selective line 44i provided in the processing unit 12.

The RAM 41b of the processing units 10 (a first memory) provides a portion of an MDIO register space, which includes a plurality of MDIO registers (first plurality of MDIO registers) specified in the CFP MSA. For example, the RAM 41b of the first processing unit 10 has a memory region (first memory region), which corresponds to the portion of the MDIO register space. The RAM 41b of the processing units 12 (a second memory) provides another portion of the MDIO register space, which includes a plurality of MDIO registers (second plurality of MDIO registers) specified in the CFP MSA. For example, the RAM 41b of the second processing unit 12 has a memory region (second memory region), which corresponds to another portion of the MDIO register space. The first memory region and the second memory region constitute the MDIO register space. Therefore, when the first memory region does not include the MDIO register designated by an MDIO register address, the second memory region includes the MDIO register designated by the MDIO register address. The first memory region and the second memory region may be mutually exclusive in the MDIO register space. In other words, the first memory region and the second memory region do not include the MDIO register designated by the same MDIO register address. When information (control command) for commanding the optical transceiver 100 to perform a particular operation is input from the controller 30, or when information related to the internal operation state is output to the controller 30 from the optical transceiver 100 in accordance with a control command, a MDIO register designated by an MDIO register address is used for giving and taking the information. More specifically, a particular MDIO register within the MDIO register space is previously designated with an MDIO register address, and information (for example, control command) is written in the designated MDIO register or stored information (for example, control data) is read from the designated MDIO register. Consequently, the optical transceiver 100 is monitored and controlled by the controller 30. For example, a relationship between control data and a control command, and a logical configuration of the MDIO register space is regulated by the CFP multiple source agreement (MSA), which is an industrial standard. The MDIO registers is virtual registers configured in the RAM 41*b*. For example, giving and taking of various kinds of data are performed between the controller 30 and the processing unit 10 (or 12) by mapping addresses of the MDIO registers (MDIO register addresses) in a particular memory region (first memory region and second memory region) of the RAM 41*b*.

(Description of MDIO Frame)

Figures 3A, 3B:
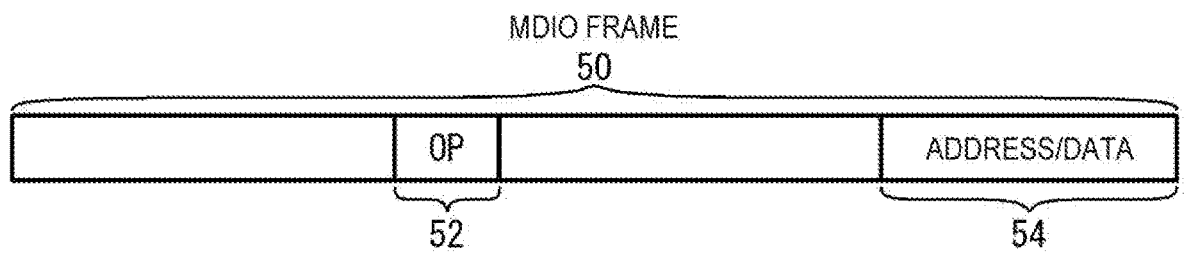
FIG. 3A is a view illustrating a configuration of an MDIO frame in Example 1.
FIG. 3B is a table showing an operation code OP and types of address/data used in the MDIO frame.

Next, a configuration of the MDIO frame related to reading and writing of an MDIO register within the processing units 10 and 12 from the controller 30 will be described. FIG. 3A is a view illustrating an MDIO frame in Example 1, and FIG. 3B is a table showing an operation code OP and types of address/data used in the MDIO frame. As illustrated in FIG. 3A, an MDIO frame 50 is configured of 64-bit binary data in full length. A 2-bit operation code OP 52 and 16-bit address/data 54 are included at a predetermined position within the MDIO frame 50. This 16-bit binary data will be referred to as a payload.

As illustrated in FIG. 3B, when the OP 52 is "00b", the access type (operation with respect to the MDIO register) becomes "address". The letter b means that the numeric value is a binary value (binary number). In this case, the address of a particular MDIO register (MDIO register address) is stored (set) in a payload for being transmitted from the controller 30 to the processing unit 10 and the processing unit 12. The MDIO register address is stored into respective MDIO address registers of the processing unit 10 and the processing unit 12. When the OP 52 is "01b", the access type becomes "write". In this case, 16-bit data is set in a payload for being transmitted from the controller 30 to the processing unit 10 and the processing unit 12. This data is written in a particular MDIO register previously designated with "address". The particular MDIO register is assigned in the processing unit 10 or the processing unit 12 as described later.

When the OP 52 is "11b", the access type becomes "read". In this case, data stored in a particular MDIO register previously designated with "address" is transmitted from the processing unit 10 or the processing unit 12 to the controller 30 in association with a position of the payload (immediately after 2-bit turnaround TA). That is, reading is performed. When the OP 52 is "10b", the access type is "read increment address". In this case, reading is performed in a manner similar to that of "read" described above. However, the access type is in a state in which an address next to the MDIO register which has been currently read is designated after reading (the MDIO register address stored in an MDIO address register has increased by one bit after reading).

In specification of an MDIO interface of CFP, the MDIO frame 50 includes a 5-bit physical port address (PHYADR) and a 5-bit MDIO device address (DEVADR), in addition to the OP 52 and the address/data (payload) 54. Since detailed description of the PHYADR and the DEVADR is disclosed in a known MDIO interface specification, it will be omitted herein.

(Description of MDIO Register)

FIG. 4 is an example of information stored in the MDIO registers in Example 1. As illustrated in FIG. 4, the Tx bias monitoring values of the lane 0 to the lane 3 are allocated in MDIO register addresses A2A0h to A2A3h of the MDIO register space. The Tx power monitoring values of the lane 0 to the lane 3 are allocated in MDIO register addresses A2B0h to A2B3h. LD temperature monitoring values which are monitoring values for the temperatures of laser diodes of the lane 0 to the lane 3 are allocated in the MDIO register addresses A2C0h to A2C3h. The Rx power monitoring values of the lane 0 to the lane 3 are allocated in MDIO register addresses A2D0h to A2D3h. For example, a control command (setting value) and control data (monitoring value) related to the optical transmission circuit 16 are stored in a memory region (first memory region) 56 of the MDIO register space. The processing unit 10 has MDIO registers (first plurality of MDIO registers) included in the region 56. For example, a control command (setting value) and control data (monitoring value) related to the optical reception circuit 18 are stored in a memory region (second memory region) 58. The processing unit 12 has MDIO registers (second plurality of MDIO registers) included in the second memory region 58. The memory regions 56 and 58 may be configured of a plurality of sub memory regions which are mutually discontinuous, instead of being configured of sub memory regions which are mutually continuous. For example, the processing unit 10 stores boundary information between the memory regions 56 and 58 in a storage device 41 in advance. With reference thereto, the processing unit 10 can determine which of the memory regions 56 and 58 includes the MDIO register designated by the MDIO register address. When the memory region includes continuous addresses, determination regarding the memory region can be efficiently performed by storing the first address and the last address thereof and determining whether the MDIO address is included between the first address and the last address. As shown in FIG. 4, when the memory region 56 does not include the MDIO register designated by an MDIO register address A2D0h (LANE0 Rx Power Monitor), the memory region 58 includes the MDIO register designated by the MDIO register address A2D0h. The memory regions 56 and 58 constitute the MDIO register space. The memory regions 56 and 58 do not include the MDIO register designated by the same MDIO register address. The memory regions 56 and 58 is mutually exclusive in the MDIO register space.

(Description of Selection Processing)

Figure 5:
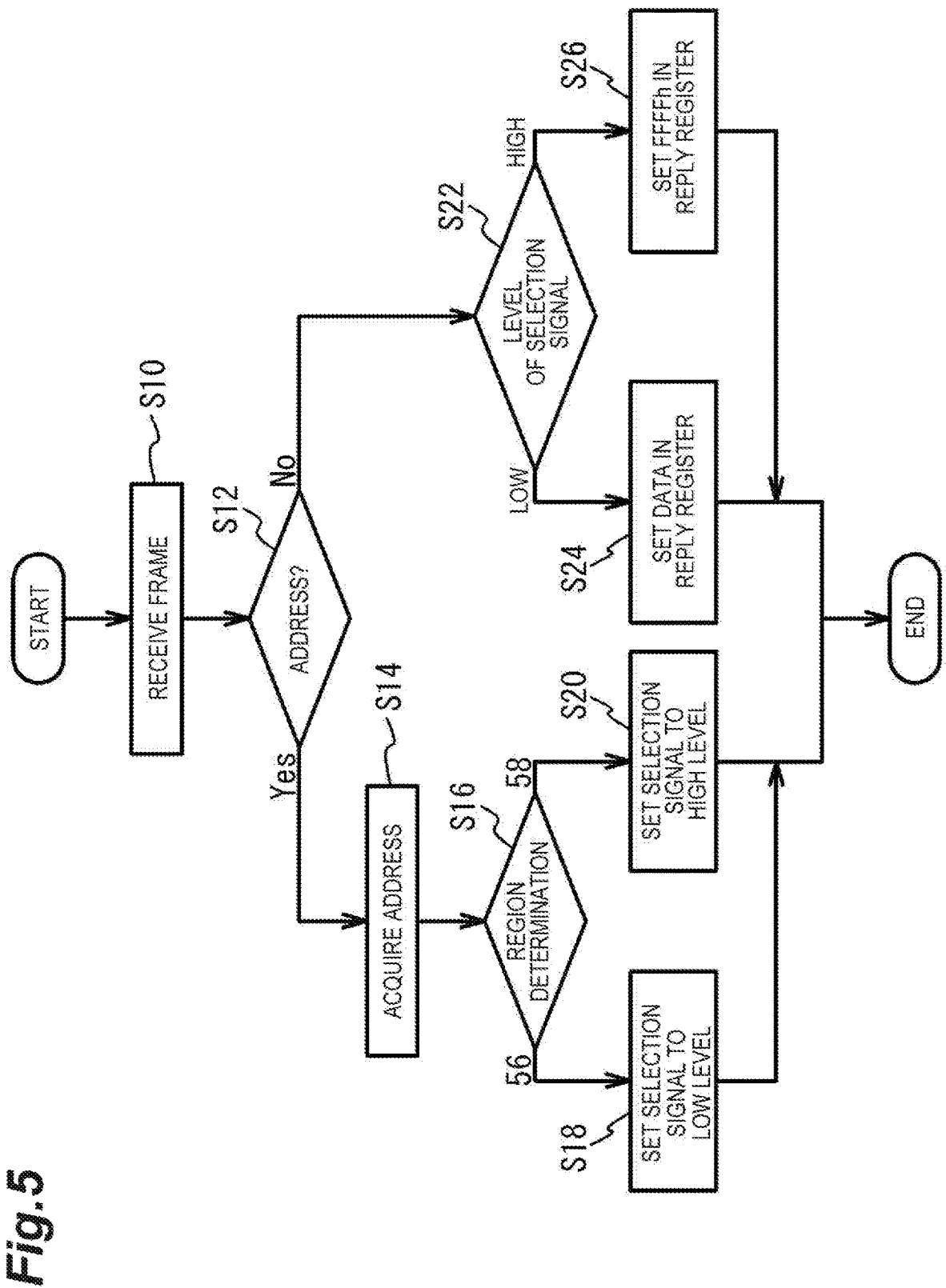
FIG. 5 is a flowchart illustrating procedures to be processed by a processing unit 10 in Example 1.

FIG. 5 is a flowchart illustrating procedures related to MDIO communication of the processing unit 10 in Example 1. This is processing performed by an optical module 100 which is instructed to respond by the controller 30 with the PHYADR. As illustrated in FIG. 5, an MDIO frame sent out to the MDIO communication bus from the controller 30 is received by the processing unit 10 (Step S10). The processing unit 10 determines whether or not the OP 52 is the MDIO register address (Step S12). The processing unit 10 determines Yes when the OP 52 is "00b" and determines No in cases other than "00b". When it is Yes, the processing unit 10 acquires an MDIO register address set in the payload (address/data) 54 of the frame 50 and stores the acquired address in a predetermined register (first MDIO address register) of the RAM 41*b* within the processing unit 10 (Step S14). The processing unit 10 determines which of the memory regions 56 and 58 in FIG. 4 includes the MDIO register designated by the MDIO register address set in the payload (address/data) 54 of the received MDIO frame 50 (Step S16). When the memory region 56 includes the MDIO register designated by the MDIO register address, the processing unit 10 sets the selection signal to be at the low level (Step S18). When the memory region 58 includes the MDIO register address, the processing unit 10 sets the selection signal to be at the high level (Step S20). Thereafter, the processing ends. The selection signal retains the level set in Step S18 or Step S20 until the selection signal is changed by the next performance of Step S18 or Step 20. The memory regions 56 and 58 are not limited to only the information related to the optical transmission circuit 16 and the optical reception circuit 18 and may include other kinds of information. For example, setting may be performed on the assumption that the memory region 56 is a memory region of the MDIO registers including information handled by the processing unit 10, and the memory region 58 is a memory region of the MDIO registers including information handled by the processing unit 12.

When the processing unit 10 finds that the OP 52 is other than "00b" (No in Step S12), the processing unit 10 checks whether the selection signal has been set to the low level or the high level (Step S22). When the selection signal is set to be at the low level, the processing unit 10 stores (writes) data set in the payload into the MDIO register which address has been designated in Step S14 in case of the OP 52="01b", or the processing unit 10 reads data from the MDIO register which address is designated by the MDIO address resister and transmits the read data to the controller 30 in case of the OP 52="11b" or "10b" (Step S24). When the selection signal is set to be at the high level, the processing unit 10 sets "FFFFh" in a reply register thereof (Step S26). Thereafter, the processing ends. The letter h means that the numeric value is a hexadecimal number.

Figure 6:
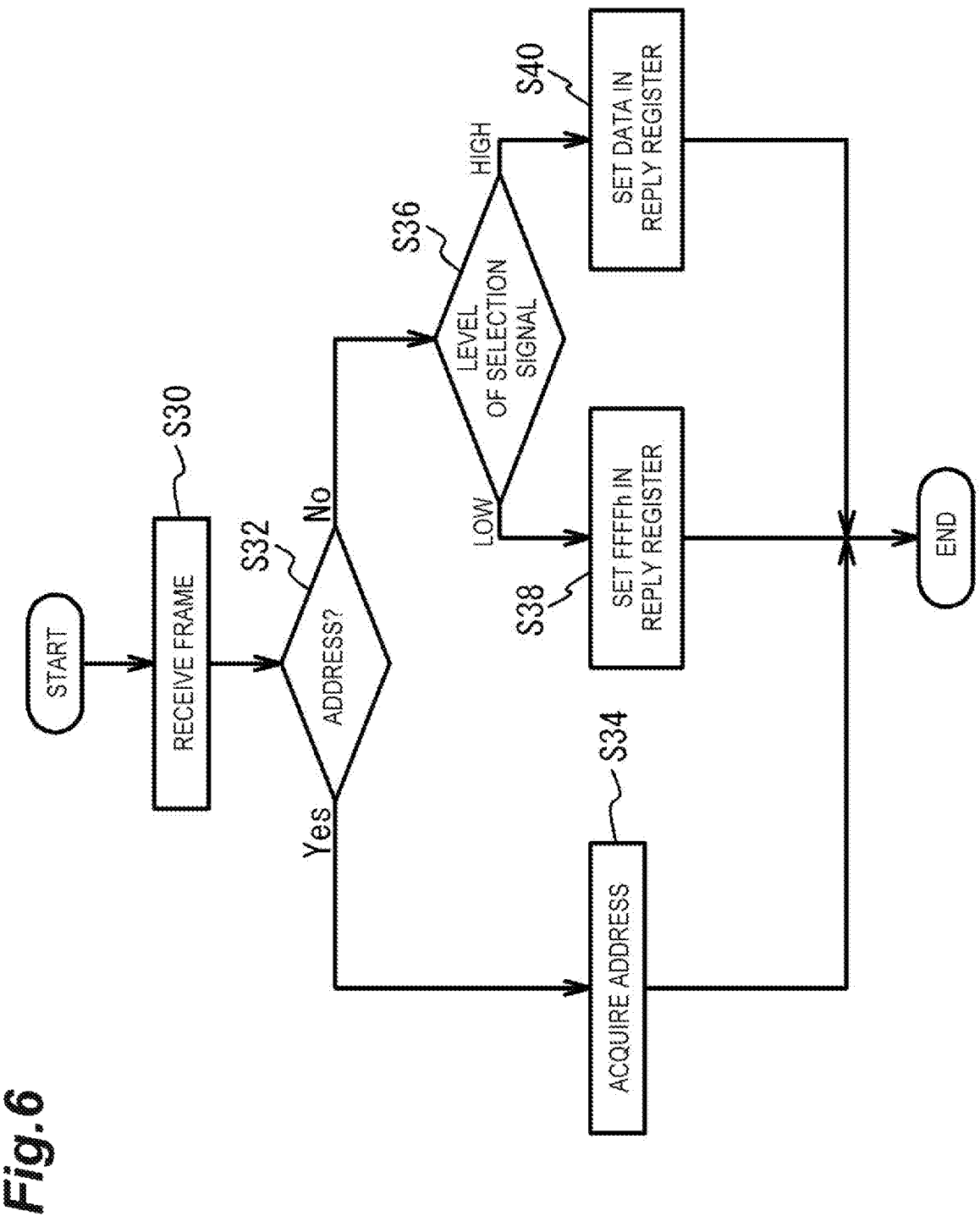
FIG. 6 is a flowchart illustrating procedures to be processed by a processing unit 12 in Example 1.

FIG. 6 is a flowchart illustrating procedures to be processed by the processing unit 12 in Example 1. As illustrated in FIG. 6, an MDIO frame sent out to the MDIO communication bus from the controller 30 is received by the processing unit 12 as well as the processing unit 10 (Step S30). As described below, since the processing units 10 and 12 are connected to the MDIO communication bus in parallel, Step 30 is performed in parallel simultaneously with Step 10. The processing unit 12 determines whether or not the OP 52 is the MDIO register address (Step S32). The processing unit 12 determines Yes when the OP 52 is "00b" and determines No in cases other than "00b". When it is Yes, the processing unit 12 acquires an MDIO register address set in the payload (address/data) 54 and stores the acquired address in a predetermined register (second MDIO address register) of the RAM 41*b* within the processing unit 12 (Step S34). Step 34 is processed by the processing unit 12 in parallel simultaneously with Step 14 being processed by the processing unit 10. The processing units 10 and 12 include the respective MDIO address registers, which store the MDIO register address set in the payload. Thereafter, the processing ends.

When the processing unit 12 finds that the OP 52 is other than "00b" (No in Step S32), the processing unit 12 checks whether the selection signal transmitted from the processing unit 10 is at the low level or the high level (Step S36). When the processing unit 12 finds that the selection signal is at the low level, the processing unit 12 sets "FFFFh" in the reply register (Step S38). When the processing unit 12 finds that the selection signal is at the high level, the processing unit 12 stores (writes) data of the payload at the MDIO register address designated in Step S34 in case of the OP 52="01b", or the processing unit 12 reads data from the MDIO register which address is designated by the MDIO address resister and transmits the read data to the controller 30 (Step S40). Thereafter, the processing ends.

Figure 7:
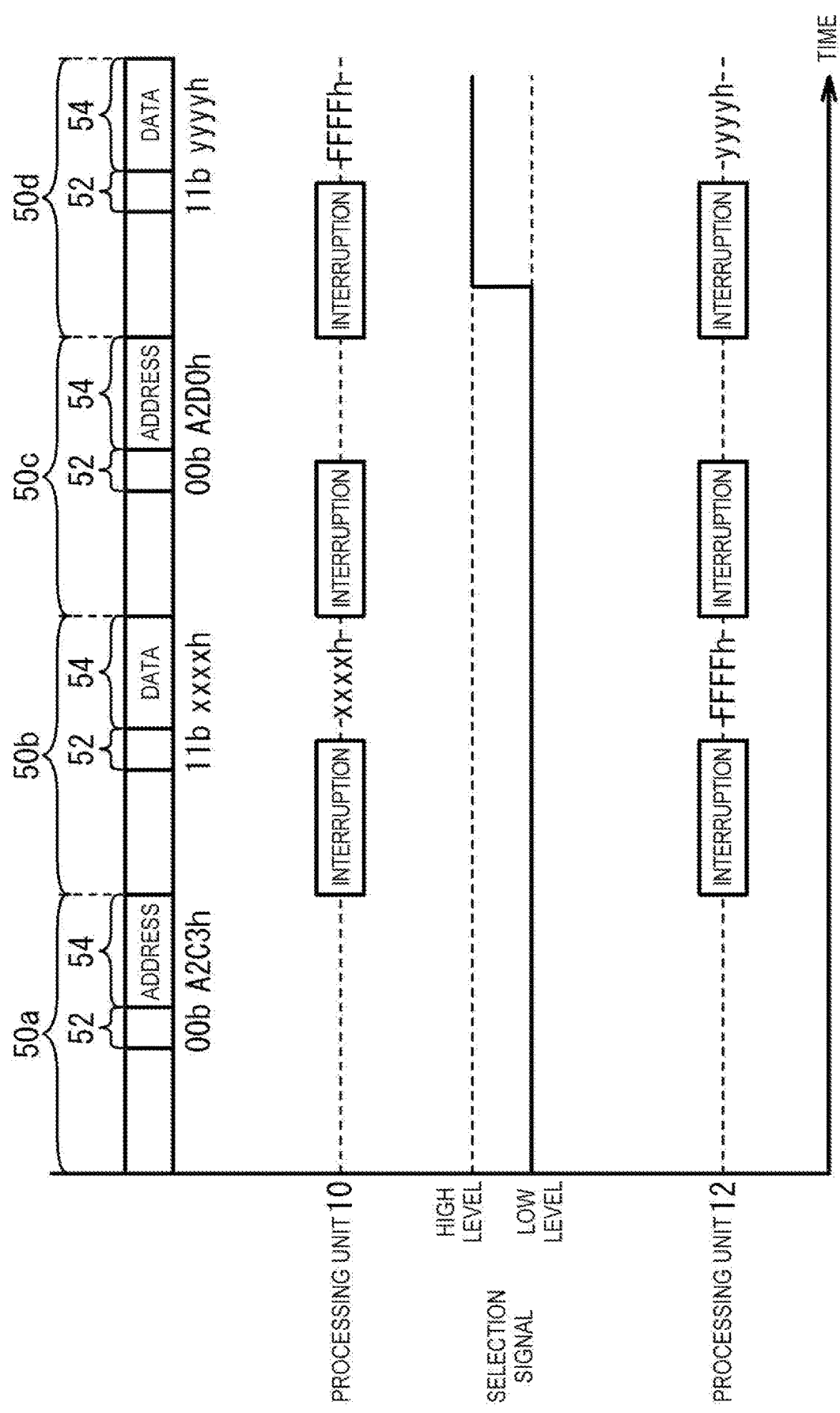
FIG. 7 is a timing chart illustrating operations of the processing units 10 and 12 in Example 1.

FIG. 7 is a timing chart illustrating operations of the processing units 10 and 12 in Example 1. As illustrated in FIG. 7, for example, the selection signal is first at a low level. An MDIO frame 50*a* is input to the processing unit 10 and the processing unit 12 (Step S10 of FIG. 5 and Step S30 of FIG. 6 are processed, respectively). The OP 52 is "00b", and the payload (address/data) 54 includes address information, for example, "A2C3h". The processing unit 10 determines Yes in Step S12 of FIG. 5. The processing unit 10 stores the MDIO register address "A2C3h" in the MDIO address register thereof in Step S14 of FIG. 5. The processing unit 10 determines which of the memory regions 56 and 58 includes the the MDIO register designated by the MDIO register address in Step S16 of FIG. 5. In FIG. 4, the MDIO register address "A2C3h" is included in the memory region 56. Thus, the processing unit 10 determines that the memory region 56 includes the MDIO register designated by the MDIO register address. The processing unit 10 sets the selection signal to the low level in Step S18 of FIG. 5. The processing unit 12 determines Yes in Step S32 of FIG. 6 and stores the MDIO register address "A2C3h" in second MDIO address register in Step S34. The processing units 10 and 12 receive the same MDIO frame 50*a* from the controller 30 via the MDIO communication bus. More specifically, each of the processing units 10 and 12 receives the same clock signal through the clock signal line MDC and receives the same data signal through the data signal line MDIO. Therefore, the processing units 10 and 12 works concurrently in parallel in accordance with the MDIO frame, namely at substantially the same timing and at substantially the same speed.

As in FIG. 7, next, an MDIO frame 50*b* is input. The OP 52 of the frame 50*b* is "11b" (read). The processing unit 10 determines No in Step S12 of FIG. 5, as no MDIO register address but data is included in the payload. The processing unit 10 checks whether the selection signal has been set to the low level or the high level in Step S22 of FIG. 5. Since the MDIO register address "A2C3h" designated with the preceding MDIO frame is included in the memory region 56, the selection signal is set to the low level. Since the selection signal is first at the low level, it remains at the low level. Accordingly, the selection signal retains the same level until it is changed in Step S18 or Step S20 of FIG. 5.

In Step S24 of FIG. 5, the processing unit 10 sets arbitrary data "XXXXh" (0000h to FFFFh) (lane 3 LD temperature monitoring value) stored in the MDIO register which address corresponds to the stored address "A2C3h", to the reply register. The data set in the reply register is sent out to the data signal line MDIO in association with the TA within the MDIO frame 50*b*, and the controller 30 receives the sent out data. Accordingly, the reply resister is used for the processing unit 10 to transmit data to the controller 30, when the OP 52 is designated to "11b" (read) or "10b" (read increment address). In this manner, reading (read) is performed in accordance with the MDIO frame 50*b*. Similar to the processing unit 10, the processing unit 12 determines No in Step S32 of FIG. 6, and finds, in Step S36, that the selection signal set to the low level by the processing unit 10 is at the low level.

The processing unit 12 sets "FFFFh" in the reply register thereof in Step S38 of FIG. 6. Although this "FFFFh" is one value of hexadecimal number, it corresponds to a continuous high level in the data signal line MDIO for 16 clock cycles. The data signal line MDIO is configured to be at the high level when no data is output from the controller 30 and the processing units 10 and 12. Therefore, when "FFFFh" is set in the reply register, the processing unit 12 actually outputs no data to the data signal line MDIO, so that the data "XXXXh" is not hindered from being output from the processing unit 10 to the data signal line MDIO as described above. That is, the processing units 10 and 12 are prevented from causing so-called bus conflict. For example, bus conflict expresses a case in which the processing unit 12 simultaneously outputs the low level to the data signal line MDIO when the processing unit 10 outputs the high level to the data signal line MDIO. There is concern that if bus conflict occurs, the voltage of the data signal line MDIO will become intermediate between the high level and the low level so that data may not be correctly transmitted.

In this manner, if the MDIO frame 50b is input to the processing units 10 and 12 from the controller 30, the processing unit 10 sets (duplicates) the data "XXXXh" stored in the MDIO register designated by the MDIO register address "A2C3h" in the reply register. The processing unit 12 sets "FFFFh" in the reply register.

As in FIG. 7, next, an MDIO frame 50c is input. The OP 52 of the frame 50c is "00b" (address). The payload (address/data) 54 contains address information, for example, "A2D0h". The processing unit 10 determines Yes in Step S12 of FIG. 5. In Step S14 of FIG. 5, the processing unit 10 acquires the MDIO register address information "A2D0h" set in the payload 54 within the MDIO frame 50c and stores the acquired address information in the MDIO address register of the RAM 41b within the processing unit 10. The processing unit 10 determines which of the memory regions 56 or 58 includes the MDIO register address in Step S16 of FIG. 5. In FIG. 4, the register address "A2D0h" is included in the memory region 58. Thus, the processing unit 10 determines that the memory region 58 includes the MDIO register address. Therefore, the processing unit 10 sets the selection signal to the high level in Step S20 of FIG. 5. The processing unit 12 determines Yes in Step S32 of FIG. 6 and stores the MDIO register address "A2D0h" in MDIO address register of the RAM 41b within the processing unit 12 in Step S34.

In this manner, if the frame 50c is input to the processing units 10 and 12 from the controller 30, the processing unit 10 switches the selection signal to the high level (in FIG. 7, the selection signal is switched to the high level at the time of a next frame 50d). The selection signal need only be switched before the processing unit 12 processes Step S36 of FIG. 6 in accordance with the MDIO frame 50d.

As in FIG. 7, next, the MDIO frame 50d is input. The OP 52 of the frame 50d is "11b" (read). The processing unit 10 determines No in Step S12 of FIG. 5. The processing unit 10 checks whether the selection signal has been set to the low level or the high level in Step S22 of FIG. 5. Since the MDIO register address "A2D0h" designated with the preceding MDIO frame 50c is included in the memory region 58, the selection signal is set to the high level. The processing unit 10 sets "FFFFh" in the reply register thereof in Step S26 of FIG. 5. The processing unit 12 determines No in Step S32 of FIG. 6. In Step S36, the processing unit 12 finds that the selection signal set to the high level by the processing unit 10 is at the high level. In Step S40 of FIG. 6, the processing unit 12 sets arbitrary data "XXXXh" (lane 0 Rx power monitoring value) stored in the MDIO register designated by the stored address information "A2D0h" in the reply register thereof. The data set in the reply register is output to the data signal line MDIO in association with the TA within the MDIO frame 50d, and the controller 30 receives the output data. In this manner, reading (read) is performed in accordance with the frame 50d.

In this manner, if the frame 50d is input to the processing units 10 and 12 from the controller 30, the processing unit 10 sets "FFFFh" in the reply register thereof. The processing unit 12 sets (duplicates) arbitrary data "YYYYh" stored in the MDIO register designated by the MDIO register address "A2D0h" in the reply register. When "FFFFh" is set in the reply register, the processing unit 10 actually outputs no data to the data signal line MDIO, so that data "YYYYh" is not hindered from being output from the processing unit 12 to the data signal line MDIO. That is, the processing units 10 and 12 are prevented from causing bus conflict in the MDIO communication bus.

The examples in which the OP 52 is "00b" and "11b" have been described. However, when the OP 52 is "01b" (write), data (for example, a control command) set in the payload 54 of the MDIO frame 50 is written in the MDIO register designated by the MDIO register address previously stored in the MDIO address register. In regarding writing of data, if both the processing units 10 and 12 have the MDIO register at a previously designated address, data may be written in each MDIO register or may be written in only one MDIO register of the processing unit 10 or 12 selected in accordance with the selection signal. In Example 1, a configuration in which any one of the processing units 10 and 12 responds in accordance with the value of the MDIO address register thereof and the selection signal is postulated, so that it is preferable that the respective MDIO register regions of the processing units 10 and 12 have no overlap to each other (or mutually exclusive) in regard to efficient utilization of the memory resources. However, since the MDIO address register stores the MDIO register address information to be a target by a command included in a MDIO frame to be received next, both the processing units 10 and 12 include the MDIO register as described above.

When the OP 52 is "10b", the processing units 10 and 12 increment the MDIO register address stored in MDIO address register thereof by one, and data of the MDIO register designated by the incremented address is set in the reply register.

Hereinabove, the example, in which the processing unit 12 not selected in accordance with the selection signal or the processing unit 10 when the processing unit 12 is selected in accordance with the selection signal sets "FFFFh" in the reply register, has been described. However, the processing unit 10 (or 12) which has not been selected may set other harmless data, which does not affect communication between the selected processing unit 12 (or 10) and the controller 30, in the reply register. For example, any other data than "FFFFh" may be set in the reply register of the processing unit unselected by the selection signal, as long as no bus conflict occurs in the MDIO communication bus.

Example 2

(Description of Downloading of Firmware)

Figure 8:
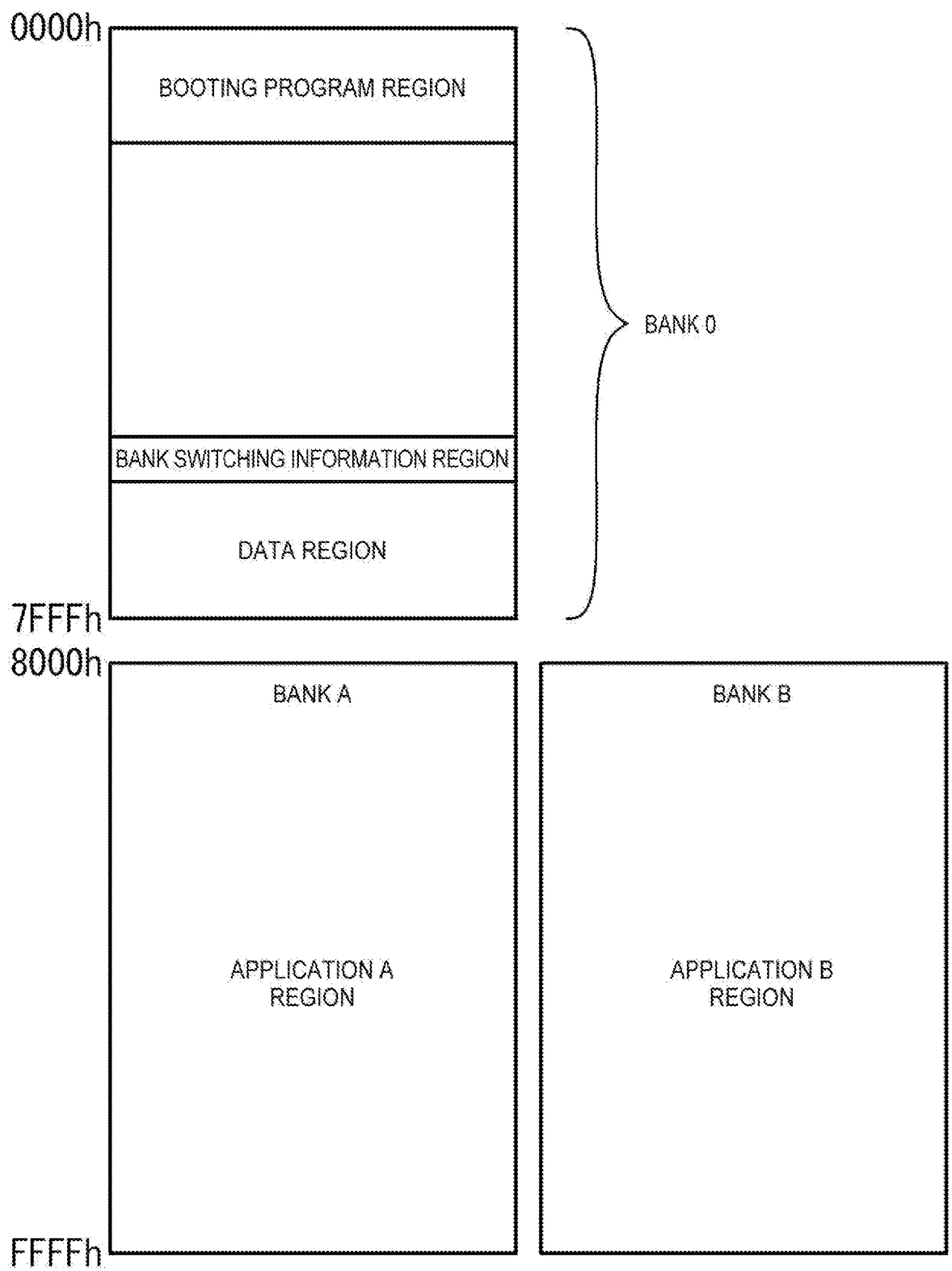
FIG. 8 is a view illustrating a memory space of a ROM within the processing unit in Example 2.

Next, Example 2 will be described. The configuration of the optical transceiver according to Example 2 is the same as the configuration of the optical transceiver according to Example 1 illustrated in FIG. 1. The internal configurations of the processing units 10 and 12 according to Example 2 are also the same as the internal configuration of the processing unit according to Example 1 illustrated in FIG. 2. FIG. 8 is a view illustrating a memory space of a ROM within the processing unit in Example 2. As illustrated in FIG. 8, the memory space within the ROM 41a of the processing units 10 and 12 includes a bank 0, a bank A, and a bank B. The bank is also called a memory bank and means aggregation of memory units having a certain capacity. The memory banks may be configured so that they correspond to memory blocks, which physically constitutes the ROM 41a. As disclosed below, the memory bank is a unit managing the memory and a processing unit performs reading and writing by switching the memory banks.

For example, the bank 0 is a region allocated from addresses 0000h to 7FFFh in an address space of the ROM 41a. The banks A and B are regions allocated from addresses 8000h to FFFFh in the address space. The bank 0 includes a booting program region, a bank switching information region, and a data region. The banks A and B respectively have an application A region and an application B region. For example, the storage capacity of each of the banks 0, A, and B is 32 kbytes.

When the optical transceiver 100 is activated and electricity is supplied to the processing units 10 and 12, a booting program stored in the booting program region is executed. Then, based on information stored in the bank switching information region, firmware stored in the bank A or B is written in a predetermined region of the RAM 41b, for example, and the firmware starts to be executed. A so-called booting operation is performed. For example, when the firmware stored in the application A region is operated, it is possible to rewrite the firmware stored in the application B region. In the following description, for example, a case in which new firmware is written in the application B domain will be described.

Figure 9:
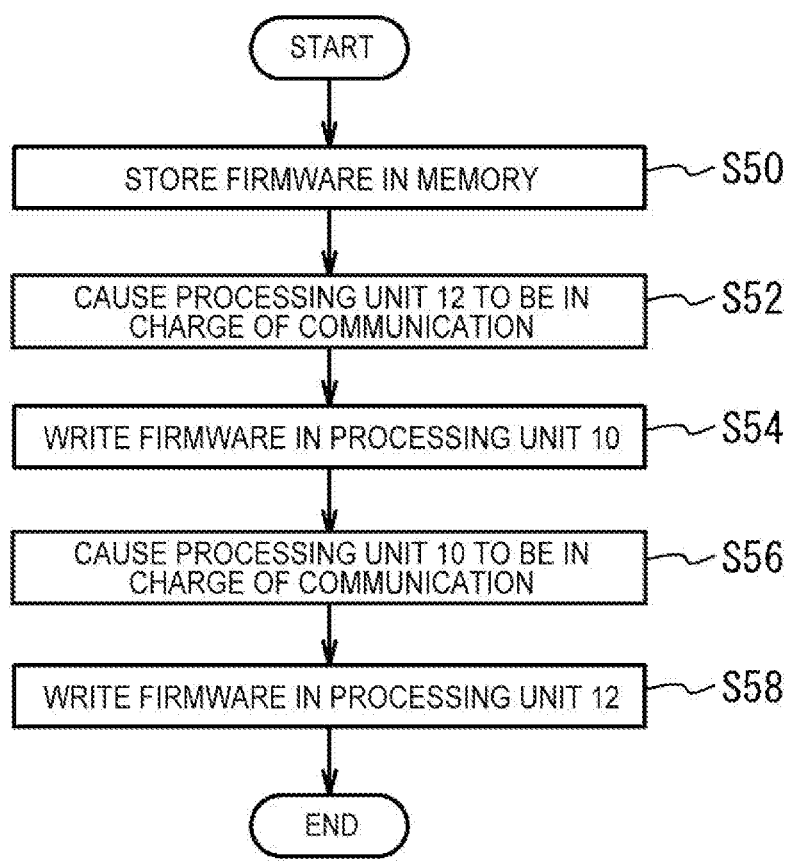
FIG. 9 is a flowchart illustrating procedures to be processed by the processing unit 10 in Example 2.

FIG. 9 is a flowchart illustrating procedures to be processed by the processing unit 10 in Example 2. As illustrated in FIG. 9, the processing unit 10 saves firmware transmitted from the controller 30 in the memory 14 (Step S50). More specifically, the size of the firmware is 32 kbytes at the maximum which is the same as the storage capacity of the bank B. Since the firmware is sent from the controller 30 through the MDIO communication bus, the firmware is transmitted by being divided into 2 bytes (16-bit) each such that it can be accommodated in the payload of the MDIO frame. The processing unit 10 sequentially writes divided data of the firmware written in a particular MDIO register in a predetermined region of the memory 14 via an SPI bus and ultimately reproduces new firmware before being divided within the memory 14. The new firmware saved in the memory 14 in such a manner is checked by the processing unit 10 or 12. Examples of check items include an inspection whether an image format is consistent, and an error inspection of a check sum, a cyclic redundancy check (CRC), or the like. When there is no problem in the checks, the processing proceeds to a next step.

The processing unit 10 causes the processing unit 12 to be in charge of communication for MDIO communication with the controller 30 (Step S52). Therefore, for example, the processing unit 10 sets the selection signal to the high level. The processing unit 10 writes the firmware reproduced in the memory 14 into the bank B of the processing unit 10 (Step S54). Meanwhile, the processing unit 12 replies to the MDIO frame transmitted from the controller 30. In Example 1, the processing unit 10 has switched the selection signal in accordance with the MDIO register address set in the payload of the MDIO frame in which "00b" (address) is set for the operation code OP. However, in Example 2, the processing unit 12 responds to the entire range of the MDIO register address while the processing unit 12 is in charge of communication. In this case, the processing unit 10 always sets "FFFFh" in the reply register such that replying of the processing unit 12 is not hindered. When writing the firmware reproduced in the memory 14 into the bank B of the processing unit 10 ends, the processing unit 10 causes the processing unit 10 to be in charge of communication for MDIO communication with the controller 30 (Step S56). For example, the processing unit 10 sets the selection signal to the low level. The processing unit 10 writes the firmware reproduced in the memory 14 in the bank B of the processing unit 12 (Step S58). In this case, the processing unit 12 may write the firmware reproduced in the memory 14 in the bank B of the processing unit 12. Thereafter, the processing ends.

Figure 10:
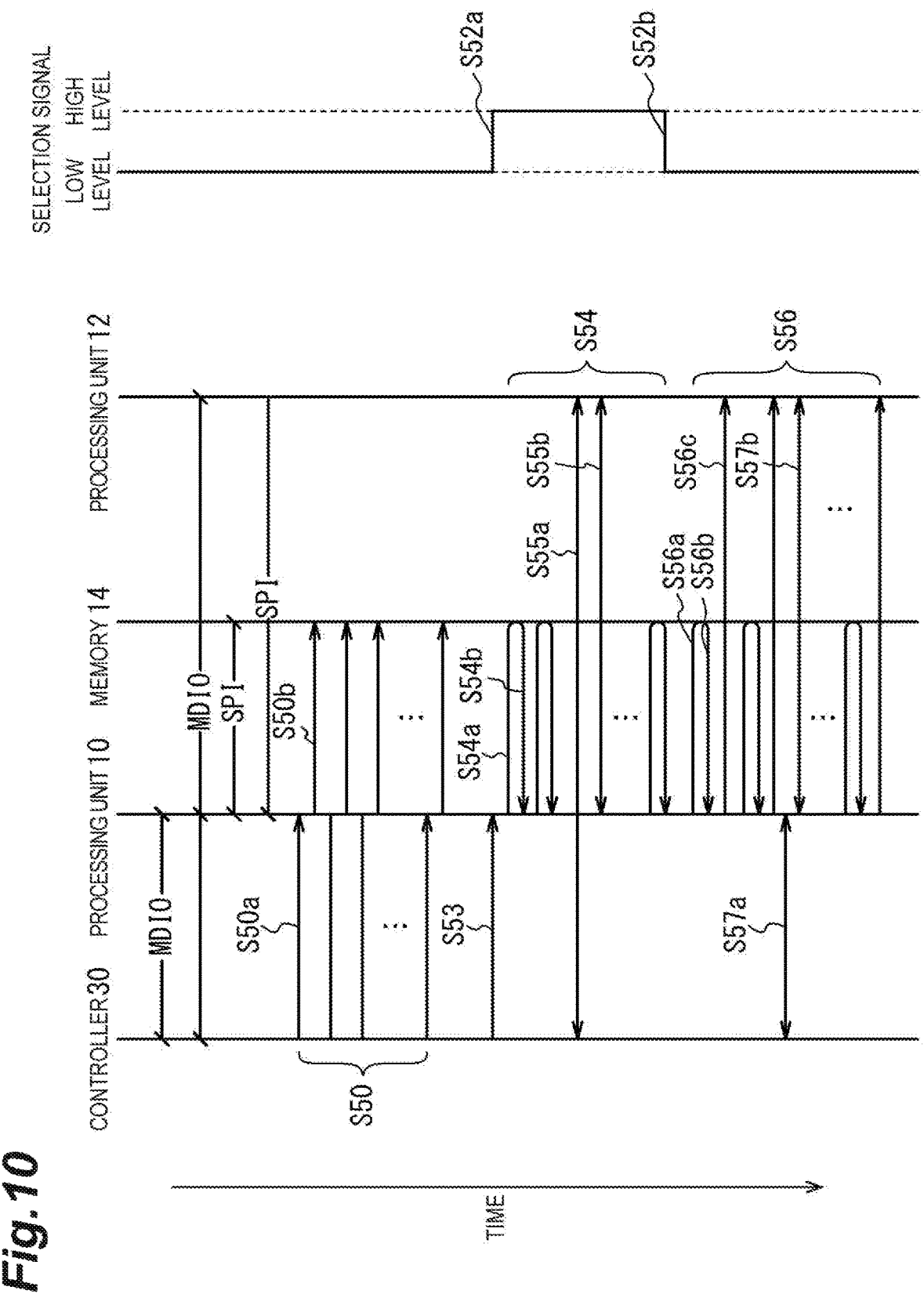
FIG. 10 is a sequence diagram illustrating communications in Example 2.

FIG. 10 is a sequence diagram illustrating communications in Example 2. As illustrated in FIG. 10, communication between the controller 30 and the processing unit 10, and communication between the controller 30 and the processing unit 12 are performed via the MDIO communication bus. Communication between the processing unit 10 and the memory 14, and communication between the processing units 10 and 12 are performed via the SPI bus.

When the optical transceiver 100 performs a normal operation, the processing unit 10 switches the selection signal to the low level or the high level in accordance with the MDIO register address set in the payload of the prior MDIO frame, similar to the case of Example 1. However, for simplifying the description, FIG. 10 illustrates a case in which the selection signal is set to the low level at the time of a normal operation. Therefore, the processing unit 10 responds to the MDIO frame transmitted from the controller 30 at all times. In this case, the processing unit 12 always sets "FFFFh" in the reply register thereof. The firmware is transmitted from the controller 30 to the processing unit 10 via the MDIO communication bus (Step S50a). The processing unit 10 saves the firmware in the memory 14 via the SPI bus without any change (Step S50b). Data which can be transmitted by using one MDIO frame is 2 bytes. Therefore, for example, when the capacity of the firmware is 32 kbytes, it is divided 2 bytes each, and performs Steps S50a and S50b 16,000 times for sending all of divided data through the MDIO communication bus to the optical transceiver 100. In this case, as described above, the processing unit 10 may temporarily stores the divided data of 2 bytes sent through the MDIO frame in the RAM 41b within the processing unit 10, may thereafter read the stored divided data from the RAM 41b, and may store the stored divided data in the memory 14. When all of the pieces of the data after division are transmitted from the controller 30, new firmware is reproduced (copied) within the memory 14.

Next, a firmware saving command is transmitted from the controller 30 to the processing unit 10 (Step S53). The processing unit 10 sets the selection signal to the high level (Step S52a). The processing unit 10 instructs the memory 14 to output the firmware (Step S54a) and writes the firmware reproduced in the memory 14 in the bank B of the processing unit 10 (Step S54b). While Steps S54a and S54b are repeated, communication of data related to the optical transmission circuit 16 (for example, data included in the domain 56 of FIG. 4) controlled by the processing unit 10 is sometimes performed with the controller 30. In this case, since the selection signal is at the high level, the processing unit 12 communicates with the controller 30 via the MDIO communication bus but not passing through the processing unit 10 (Step S55a). For example, when writing is performed in the ROM 41a within the processing unit, there may be cases in which writing takes a longer time than a cycle of MDIO communication. In such a case, the processing unit 12 responds thereto, so that MDIO communication with the controller 30 can normally continue even when the processing unit 10 cannot respond thereto within a predetermined time. As necessary, the processing unit 12 performs communication with the processing unit 10 via the SPI bus (Step S55b).

When writing of the firmware in the processing unit 10 ends, the processing unit 10 sets the selection signal to the low level (Step S52b). The processing unit 10 instructs the memory 14 to output the firmware (Step S56a). The processing unit 10 acquires the firmware reproduced in the memory 14 (Step S56b) and writes the firmware in the bank B of the processing unit 12 (Step S56c). Alternatively, instead of the processing unit 10, the processing unit 12 may acquire the firmware reproduced in the memory 14 (an alternative step corresponding to Step S56b, not shown), and may write the firmware in the bank B of the processing unit 12 (an alternative step corresponding to Step S56c, not shown). While Steps S56a to S56c are repeated, communication of data related to the optical reception circuit 18 (for example, data included in the domain 58 of FIG. 4) controlled by the processing unit 12 is sometimes performed with the controller 30. In this case, the selection signal remains at the low level without any change, and the processing unit 10 communicates with the controller 30 via the MDIO communication bus (Step S57a). As necessary, the processing unit 10 performs communication with the processing unit 12 via the SPI bus (Step S57b). When the new firmware is not written in the processing unit 12, Steps S56a, S56b, S56c, S57a, and S57b (Step S56) may be omitted. For example, in the description above, it is postulated that the processing units 10 and 12 have the same configuration as each other and each thereof can be operated by executing the same firmware. However, the processing units 10 and 12 may be operated by pieces of firmware different from each other, or firmware may be written in only one of the processing units 10 and 12 for its configuration.

In Step S56, the processing unit 10 acquires the firmware via the SPI bus and transmits the acquired firmware to the processing unit 12. However, when the processing unit 12 and the memory 14 can directly communicate with each other via the SPI bus as described above, the firmware may be directly transferred to the processing unit 12 from the memory 14 without passing through the processing unit 10. Such direct transfer may reduce the total time necessary for writing the new firm ware to the bank B of the processing unit 12.

Comparative Example 1

Figure 11:
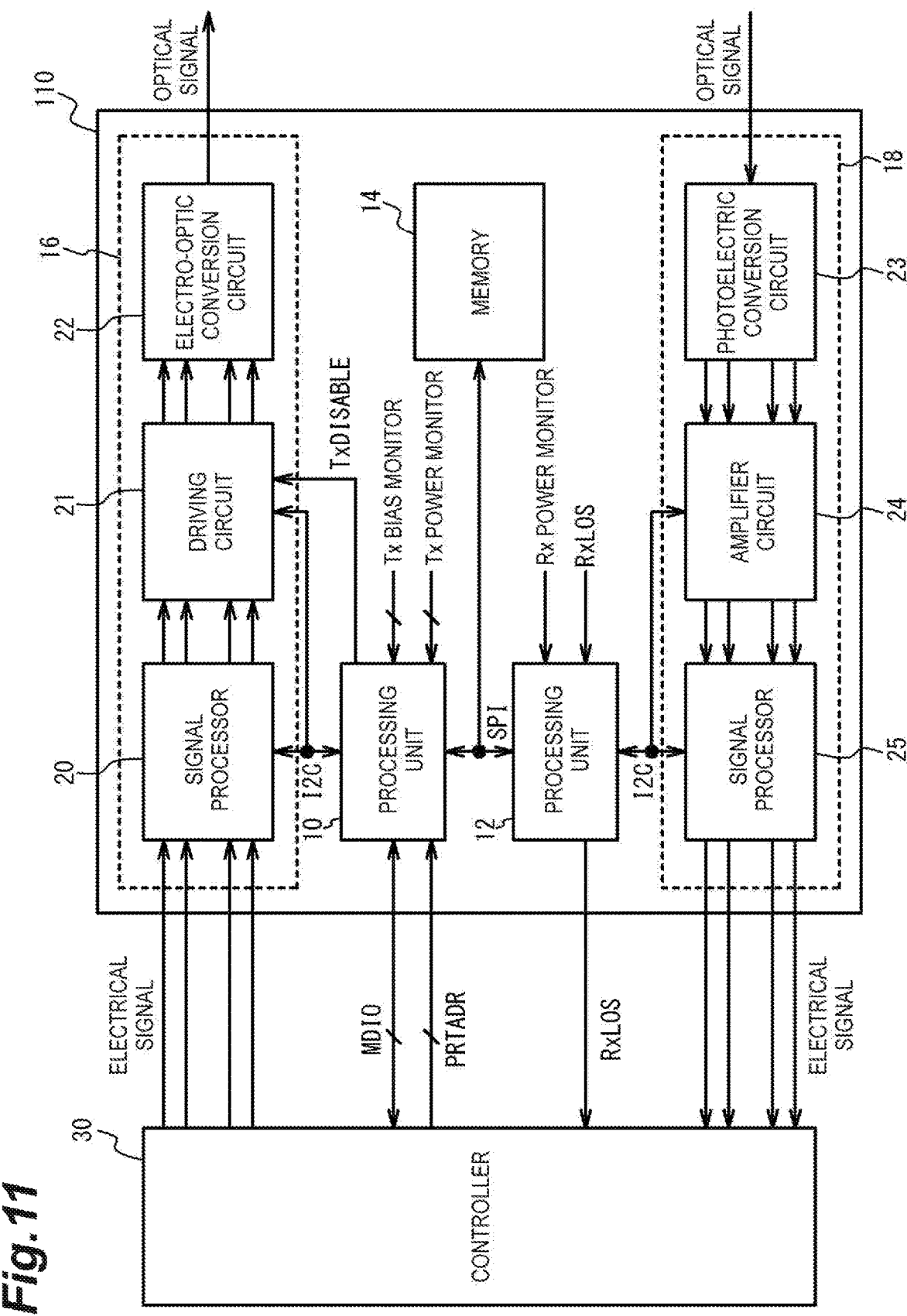
FIG. 11 is a block diagram of an optical transceiver according to Comparative Example 1.

FIG. 11 is a block diagram of an optical transceiver according to Comparative Example 1. As illustrated in FIG. 11, in an optical transceiver 110, the serial communication bus for communicating with the controller 30 such as the MDIO communication bus is connected to the processing unit 10 and is not connected to the processing unit 12. A selective line from the processing unit 10 to the processing unit 12 is not provided. Other configurations are the same as those in FIG. 1 of Example 1, and description thereof will be omitted.

In Comparative Example 1, the processing unit 10 is in charge of communication with the controller 30 via the serial communication bus. Therefore, when the processing unit 12 communicates with the controller 30, communication is indirectly performed via the processing unit 10. Accordingly, transmission of information is delayed compared to the case in which the controller 30 and the processing unit 12 directly communicate with each other. While the firmware reproduced in the memory 14 is written in the processing unit 10, even if there is an inquiry from the controller 30, when the time required for writing is longer than a cycle of MDIO communication, it is difficult to respond thereto within a predetermined time. Accordingly, for example, there is concern that MDIO communication will be suspended and the controller 30 will detect abnormality.

Effects of Example 1

According to Example 1, as in FIG. 1, the processing unit 10 (first processing unit) controls the optical transmission circuit 16. The processing unit 12 (second processing unit) controls the optical reception circuit 18. The serial communication bus connects the controller 30 (external apparatus) and the processing unit 10 to each other and connects the controller 30 and the processing unit 12 to each other in parallel with the processing unit 10. As in Steps S22 to S26 of FIG. 5, the processing unit 10 selects a processing unit between the processing unit 10 and the processing unit 12 for performing communication with the controller 30 via the serial communication bus, based on the data received from the controller 30 via the serial communication bus.

Accordingly, the processing unit 10 can dynamically and appropriately select a processing unit for communicating with the controller 30. Thus, for example, when the processing unit 10 selects the processing unit 12 as the processing unit for communicating with the controller 30, the processing unit 12 can communicate with the controller 30 without passing through the processing unit 10. When the processing unit 10 selects the processing unit 10 as the processing unit for communicating with the controller 30, the processing unit 10 can communicate with the controller 30 without passing through the processing unit 12. Accordingly, it is possible to suppress a delay in communication between the controller 30 and the optical transceiver 100 via the serial communication bus.

In Example 1, an example in which the processing unit 10 controls the optical transmission circuit 16 and the processing unit 12 controls the optical reception circuit 18 has been described. However, the processing unit 10 need only control a part of the optical transmission circuit 16 and the optical reception circuit 18, and the processing unit 12 need only control another part of the optical transmission circuit 16 and the optical reception circuit 18. That is, the MDIO registers of the memory region 56 in FIG. 4 stores information for controlling a part of the optical transmission circuit 16 and the optical reception circuit 18. The MDIO registers of the memory region 58 in FIG. 4 stores information for controlling another part of the optical transmission circuit 16 and the optical reception circuit 18. The roles of the processing units 10 and 12 being in charge may be divided based on the lanes. For example, the processing unit 10 may control the functions related to the lane 0 and the lane 1 of the optical transmission circuit 16 and the optical reception circuit 18, and the processing unit 12 may control the functions related to the lane 2 and the lane 3. The roles of the processing units 10 and 12 being in charge may be divided based on the functions. For example, the processing unit 10 may be in charge of the signal processors 20 and 25, and the processing unit 12 may be in charge of the driving circuit 21, the electro-optic conversion circuit 22, the amplifier circuit 24, and the photoelectric conversion circuit 23. Alternatively, the address space of the MDIO registers may be suitably divided into two, such that the processing unit 10 is in charge of one memory region (first memory region) and the processing unit 12 is in charge of the remaining memory region (second memory region). For example, the MDIO register address of the MDIO register which becomes the border may be determined as border address, such that the processing unit 10 is in charge of memory region having addresses smaller than that and the processing unit 12 is in charge of the memory region having the border address and addresses larger than that. In such a manner, switching of the selection signal can be simply determined, and a processing time can be shortened.

As in Steps S14 to S20 of FIG. 5, the serial communication bus is an MDIO communication bus. Accordingly, it is possible to suppress a delay in communication between the controller 30 and the optical transceiver 100 via the MDIO communication bus. The processing unit 10 selects a processing unit for performing communication with the controller 30 via the MDIO communication bus out of the processing units 10 and 12 based on the MDIO register address included in the payload of the MDIO frame. Accordingly, the processing unit 10 can dynamically and appropriately select a processing unit for performing communication via the MDIO communication bus.

Moreover, as in Steps S16 to S20 of FIG. 5, in the processing unit 10, when the MDIO register address included in the MDIO frame is an address related to a part controlled by the processing unit 12 of the optical transmission circuit 16 and the optical reception circuit 18, the processing unit 10 selects a processing unit 10 for performing communication via the serial communication bus. When the MDIO register address included in the MDIO frame is an address related to another part controlled by the processing unit 12 of the optical transmission circuit 16 and the optical reception circuit 18, the processing unit 12 is selected as the processing unit for performing communication via the serial communication bus.

For example, as in FIG. 4, the memory region 56 (first memory region) includes the first MDIO register, and the memory region 58 (second memory region) includes the second MDIO register. As in FIG. 5, in the processing unit 10, based on the MDIO register address included in the MDIO frame (for example, the payload 54 of the frame 50a in FIG. 7) received from the controller 30 via the MDIO communication bus, when the MDIO register address information is included in the memory region 56, the processing unit 10 responds to an MDIO frame received after the MDIO frame (for example, the frame 50b in FIG. 7). When the MDIO register address information (for example, the payload 54 of the frame 50c in FIG. 7) is included in the second address space, the processing unit 12 is caused to respond to an MDIO frame received after the MDIO frame (for example, the frame 50d in FIG. 7).

For example, when the MDIO register address included in the MDIO frame (for example, the payload 54 of the frame 50a in FIG. 7) received from the controller 30 via the MDIO communication bus is included in the memory region 56 including the MDIO register provided in the processing unit 10, the selection signal is set to a first value (for example, the low level in FIG. 7). When the MDIO register address included in the MDIO frame (for example, the payload 54 of the frame 50c in FIG. 7) is included in the memory region including the MDIO register provided in the processing unit 12, the selection signal is set to a second value (for example, the high level in FIG. 7). When the selection signal is set to the first value (for example, the low level), the processing unit 10 responds to the MDIO frame (for example, the frame 50b in FIG. 7) received after the MDIO frame (for example, the frame 50a in FIG. 7). When the selection signal is set to the second value (for example, the high level in FIG. 7), the processing unit 12 responds to the MDIO frame (for example, the frame 50d in FIG. 7) received after the MDIO frame (for example, the frame 50c in FIG. 7).

Accordingly, the processing unit 10 can more appropriately select the processing unit for more quickly performing communication via the MDIO communication bus with the controller 30.

As in Step S50 of FIG. 9 and FIG. 10, the memory 14 stores the firmware of the processing units 10 and 12 transmitted from the controller 30 via the serial communication bus. During a period in which the processing unit 10 acquires the firmware stored in the memory 14 as in Step S54, the processing unit 12 communicates with the controller 30 via the serial communication bus as in Step S55a. During a period in which the processing unit 12 acquires the firmware stored in the memory 14 as in Step S56, the processing unit 10 communicates with the controller 30 via the serial communication bus as in Step S57a.

For example, as in Step S50b of FIG. 10, the processing unit 10 stores the divided data of the firmware received from the controller 30 in the memory 14. As in Step S52a of FIG. 10, when the firmware is reconfigured within the memory 14, the processing unit 10 causes the processing unit 12 to communicate with the controller 30 via the MDIO communication bus. As in Steps S54a and S54b of FIG. 10, the processing unit 10 acquires the firmware reproduced within the memory 14 in parallel.

Accordingly, while the firmware reproduced in the memory 14 is written in the processing unit 10, even if there is an inquiry from the controller 30, the processing unit 12 can respond thereto.

In Example 1, an example in which the optical transceiver has the processing units 10 and 12 has been described. However, three or more processing units may be employed. The processing unit 10 may select a processing unit from three or more processing units for performing communication with the controller 30 via the serial communication bus based on the data received from the controller 30 via the serial communication bus. For example, the processing unit can be switched fast by notifying the selected processing unit that the processing unit is selected using the selective line, and notifying the processing unit which has not been selected that the processing unit is not selected using another selective line.

It should be considered that the embodiment disclosed this time is merely an example in all respects and it is not restrictive. The scope of the present invention is not limited to the foregoing meanings and is intended to include all changes indicated by the claims within the meaning and scope equivalent to the claims.

What is claimed is:

1. An optical transceiver configured to receive a Management Data Input/Output (MDIO) frame from an external apparatus through a MDIO communication bus, the MDIO frame having an operation (OP) code set to "00h" and a MDIO register address set in a payload thereof, the optical transceiver comprising:

an optical transmission circuit configured to convert a first electrical signal into a first optical signal;

an optical reception circuit configured to convert a second optical signal into a second electrical signal;

a first processing unit configured to control a section of the optical transmission circuit and to communicate with the external apparatus through the MDIO communication bus, the first processing unit including a first memory having a first memory region, the first memory region including a first plurality of MDIO registers that store data for controlling said optical transmission circuit section;

a second processing unit configured to control a section of the optical reception circuit and to communicate with the external apparatus through the MDIO communication bus, the second processing unit including a second memory having a second memory region, the second memory region including a second plurality of MDIO registers that store data for controlling said optical reception circuit section; and a signal line for sending a selection signal from the first processing unit to the second processing unit, wherein the first memory region and the second memory region constitute a MDIO register space, wherein the selection signal is set to a first level when the first memory region includes a MDIO register designated by the MDIO register address, and alternatively set to a second level when the second memory region includes the MDIO register designated by the MDIO register address, and wherein the first processing unit responds to another MDIO frame having an OP code set to other than "00h" when the selection signal is at the first level, and the second processing unit alternatively responds to the another MDIO frame when the selection signal is at the second level.

2. The optical transceiver according to claim 1, wherein the first processing unit further includes a first MDIO address register, and the first processing unit stores the MDIO register address in the first MDIO address register, when the selection signal is at the first level, and wherein the second processing unit further includes a second MDIO address register, and the second processing unit stores the MDIO register address in the second MDIO address register, when the selection signal is at the second level.

3. The optical transceiver according to claim 1, wherein the first memory region and the second memory region are mutually exclusive in the MDIO register space.

4. The optical transceiver according to claim 3, further comprising:

a nonvolatile memory configured to store reproduced firmware of the first processing unit sent out from the external apparatus through the MDIO communication bus, wherein the first processing unit acquires the reproduced firmware from the nonvolatile memory and the second processing unit communicates with the external apparatus through the MDIO communication bus in parallel when the selection signal is at the second level, and wherein the second processing unit acquires the reproduced firmware from the nonvolatile memory and the first processing unit communicates with the external apparatus through the MDIO communication bus in parallel when the selection signal is at the first level.

5. A method of controlling an optical transceiver including an optical transmission circuit configured to convert a first electrical signal into a first optical signal, an optical reception circuit configured to convert a second optical signal into a second electrical signal, a first processing unit configured to control a section of the optical transmission circuit and including a first memory having a first memory region, the first memory region including a first plurality of Management Data Input/Output (MDIO) registers that store data for controlling said optical transmission circuit section, a second processing unit configured to control a section of the the optical reception circuit and including a second memory having a second memory region, the second memory region including a second plurality of MDIO registers that store data for controlling said optical reception circuit section, a MDIO communication bus connected to the first processing unit and the second processing unit and capable of being electrically connected to an external MDIO communication bus of an external apparatus, and a signal line for sending a selection signal from the first processing unit to the second processing unit, the method comprising:

receiving a MDIO frame from the external apparatus through the external MDIO communication bus and the MDIO communication bus, the MDIO frame having an operation (OP) code set to "00h" and a MDIO register address set in a payload thereof, setting the selection signal to a first level when the first memory region includes a MDIO register designated by the MDIO register address, and setting the selection signal to a second level when the second memory region includes the MDIO register designated by the MDIO register address, receiving another MDIO frame from the external apparatus through the external MDIO communication bus and the MDIO communication bus, the another MDIO frame having an OP code set to other than "00h", and responding to the another MDIO frame by the first processing unit when the selection signal is at the first level, and alternatively by the second processing unit when the selection signal is at the second level.

6. The optical transceiver according to claim 1, wherein the first processing unit is configured to further control a section of the optical reception circuit, wherein the section of the optical reception circuit controlled by the first processing unit is other than said section of the optical reception circuit controlled by the second processing unit, wherein the first memory region further includes a third plurality of MDIO registers that store data for controlling the section of the optical reception unit controlled by the first processing unit, wherein the second processing unit is configured to further control a section of the optical transmission circuit, wherein the section of the optical transmission circuit controlled by the second processing unit is other than said section of the optical transmission circuit controlled by the first processing unit, and wherein the second memory region further includes a fourth plurality of MDIO registers that store data for controlling the section of the optical transmission unit controlled by the second processing unit.

7. The optical transceiver according to claim 6, wherein the first processing unit further includes a first MDIO address register, and the first processing unit stores the MDIO register address in the first MDIO address register when the selection signal is at the first level, and wherein the second processing unit further includes a second MDIO address register, and the second processing unit stores the MDIO register address in the second MDIO address register, when the selection signal is at the second level.

8. The optical transceiver according to claim 6,
wherein the first memory region and the second memory region are mutually exclusive in the MDIO register space.

9. The optical transceiver according to claim 8, further comprising:
a nonvolatile memory configured to store reproduced firmware of the first processing unit sent out from the external apparatus through the MDIO communication bus,
wherein the first processing unit acquires the reproduced firmware from the nonvolatile memory and the second processing unit communicates with the external apparatus through the MDIO communication bus in parallel when the selection signal is at the second level, and
wherein the second processing unit acquires the reproduced firmware from the nonvolatile memory and the first processing unit communicates with the external apparatus through the MDIO communication bus in parallel when the selection signal is at the first level.

10. The method according to claim 5,
wherein the first processing unit is configured to further control a section of the optical reception circuit,
wherein the section of the optical reception circuit controlled by the first processing unit is other than said section of the optical reception circuit controlled by the second processing unit,
wherein the first memory region further includes a third plurality of MDIO registers that store data for controlling the section of the optical reception unit controlled by the first processing unit,
wherein the second processing unit is configured to further control a section of the optical transmission circuit,
wherein the section of the optical transmission circuit controlled by the second processing unit is other than said section of the optical transmission circuit controlled by the first processing unit, and
wherein the second memory region further includes a fourth plurality of MDIO registers that store data for controlling the section of the optical transmission unit controlled by the second processing unit.

* * * * *